(12) United States Patent
Treml et al.

(10) Patent No.: US 11,210,960 B2
(45) Date of Patent: Dec. 28, 2021

(54) DEVICE FOR THE REPRESENTATION OF TACTILE CHARACTERS

(71) Applicant: TECHNISCHE UNIVERSITÄT WIEN, Vienna (AT)

(72) Inventors: Michael Treml, Vienna (AT); Wolfgang Zagler, Vienna (AT); Dominik Busse, Munich (DE)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 378 days.

(21) Appl. No.: 16/312,163

(22) PCT Filed: Jul. 7, 2017

(86) PCT No.: PCT/EP2017/067093
§ 371 (c)(1),
(2) Date: Jul. 23, 2019

(87) PCT Pub. No.: WO2018/007589
PCT Pub. Date: Jan. 11, 2018

(65) Prior Publication Data
US 2019/0347944 A1    Nov. 14, 2019

(30) Foreign Application Priority Data

Jul. 7, 2016   (AT) .............................. A 50603/2016

(51) Int. Cl.
*G09B 1/28*   (2006.01)
*G09B 1/18*   (2006.01)
*G09B 21/00*  (2006.01)

(52) U.S. Cl.
CPC ................. *G09B 1/28* (2013.01); *G09B 1/18* (2013.01); *G09B 21/004* (2013.01)

(58) Field of Classification Search
CPC ............. G09B 1/18; G09B 1/28; G09B 21/00
See application file for complete search history.

(56) References Cited

U.S. PATENT DOCUMENTS 2,371,325 A   3/1945  Wessborg
6,776,619 B1  8/2004  Roberts et al.
(Continued)

FOREIGN PATENT DOCUMENTS

CN   204502402 U   7/2015
CN   204745611 U   11/2015
(Continued)

OTHER PUBLICATIONS

"Lego—Ergänzungsschachteln," Horst-Lehner Website, Retrieved Aug. 29, 2017 at http://horst-lehner.mausnet.de/lego/katalog/gk65/GK65G-2.JPG, Available as Early as Dec. 30, 1965, 1 page.
(Continued)

*Primary Examiner* — Vinh T Lam
(74) *Attorney, Agent, or Firm* — McCoy Russell LLP

(57) ABSTRACT

The invention relates to a device for the representation of tactile characters, in particular in Braille, comprising tactile elements which are combined in groups, wherein a tactile character consists in each case of a matrix of tactile points, which can be arranged in two adjacently arranged columns of points and at least two lines of points, wherein the four possible combinations of two tactile points of tactile points arranged adjacently in a line of points are in each case arranged on a common tactile element.

20 Claims, 14 Drawing Sheets

(56) References Cited

U.S. PATENT DOCUMENTS

| | | | | |
|---|---|---|---|---|
| 2009/0286211 A1* | 11/2009 | Eisenhardt | ........... | A61B 5/7475 |
| | | | | 434/113 |
| 2013/0203022 A1* | 8/2013 | Al-Qudsi | ............. | G09B 21/004 |
| | | | | 434/113 |
| 2015/0206453 A1* | 7/2015 | Yip | ...................... | G09B 21/003 |
| | | | | 434/113 |
| 2017/0352291 A1* | 12/2017 | Kim | ..................... | G09B 21/004 |

FOREIGN PATENT DOCUMENTS

| | | | | |
|---|---|---|---|---|
| DE | 60300882 T2 | 5/2006 | | |
| GB | 2440121 A | 1/2008 | | |
| JP | 2006276559 | * 10/2006 | ............ | G09B 21/00 |
| SU | 1633445 A1 | 3/1991 | | |

OTHER PUBLICATIONS

ISA European Patent Office, International Search Report Issued in Application No. PCT/EP2017/067093, dated Sep. 6, 2017, WIPO, 6 pages.

State Intellectual Property Office of the People's Republic of China, Office Action and Search Report Issued in Application No. 201780038582.4, dated Jun. 1, 2020, 12 pages. (Submitted with Partial Translation).

* cited by examiner

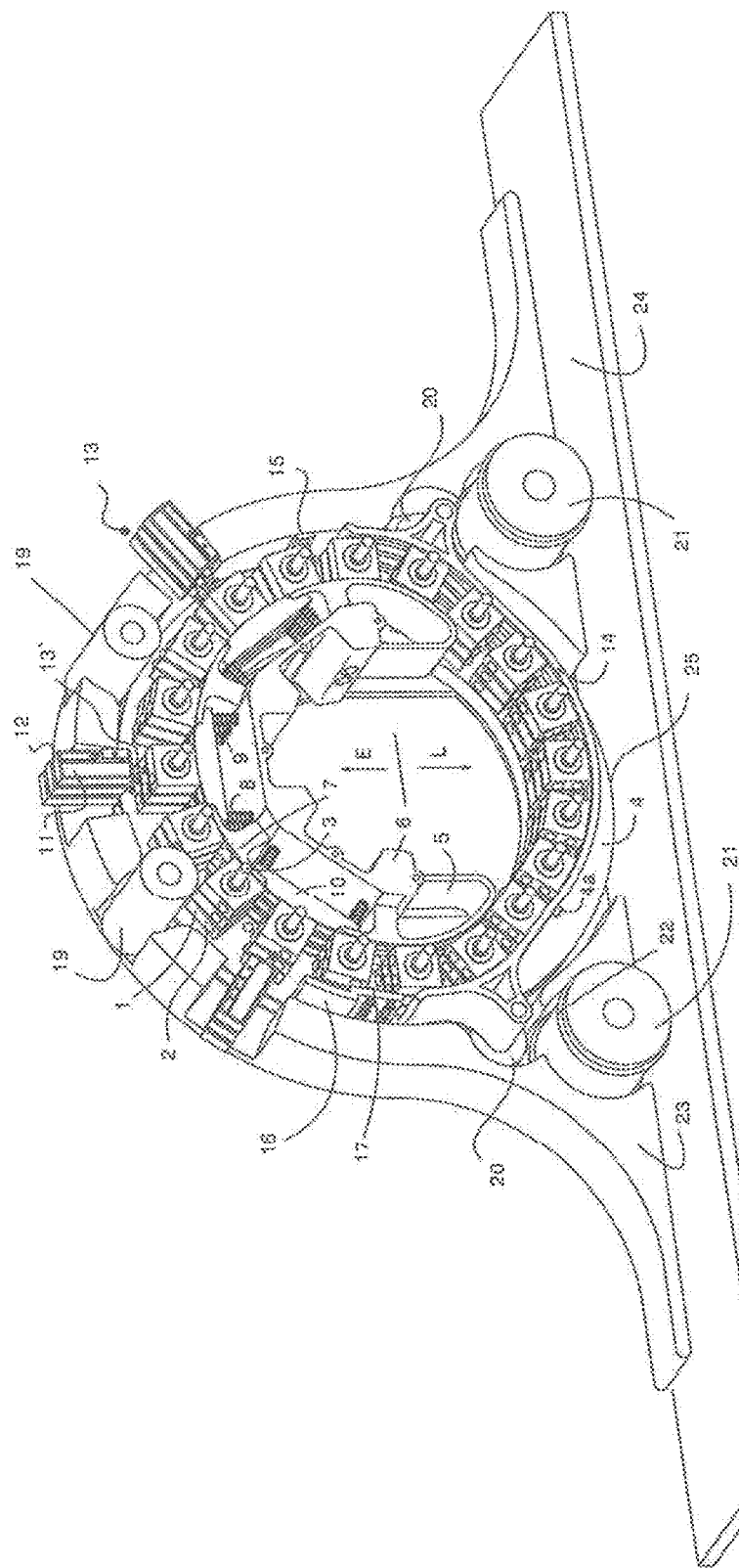

DEVICE FOR THE REPRESENTATION OF TACTILE CHARACTERS

CROSS-REFERENCE TO RELATED APPLICATIONS

The present application is a U.S. National Phase of International Patent Application Serial No. PCT/EP2017/067093 entitled "DEVICE FOR THE REPRESENTATION OF TACTILE CHARACTERS," filed on Jul. 7, 2017. International Patent Application Serial No. PCT/EP2017/067093 claims priority to Austrian Patent Application No. A 50603/2016, filed on Jul. 7, 2016. The entire contents of each of the above-cited applications are hereby incorporated by reference in their entirety for all purposes.

TECHNICAL FIELD

The invention relates to a device for the representation of tactile characters, in particular in Braille, comprising tactile elements which are combined in groups, wherein a tactile character consists in each case of a matrix of tactile points which can be arranged in two adjacently arranged columns of points and at least two lines of points.

In order to allow blind and highly visually impaired people access to textual information, in particular the use of so-called Braille has become established. In this script system, an individual character—usually called form—is used with six or sometime even eight raised tactile points which, for example can be touched with the fingers; numbers in Braille script can, depending on the type of representation also merely occupy two lines of points. The tactile characters, in particular in the case of representing Braille script, accordingly consist of a matrix of two columns of points and at least two, preferably three or four lines of points.

In this case the column spacing between two tactile points of a line of points and the line spacing between two tactile points of a point column (column of points) is the same, wherein the spacing from the next tactile character (form) is configured to be larger compared to the spacing between two tactile points of a character. Usual dimensions also exist for the diameter of the tactile points and the height thereof.

In addition to the representation on static media such as paper, Braille script is also implemented in refreshable Braille displays, whereby access to digital information is made possible by analogy with a screen. Conventional displays of this type in which each point is controlled individually however only represent one line of text of typically twenty to eighty characters. As a result of the many small parts and the individual control, these displays are expensive. Compared with optical screens, these Braille displays furthermore have the disadvantage that they include complex and fragile mechanisms in order to be able to raise and lower individual points of a form.

Various concepts have already been developed for the purpose of simplification none of which, however have so far been able to penetrate the classical Braille text line. Many solution approaches rely on deformable materials which use possibly electrochemical or electrothermal reactions.

A further simplification approach consists in accommodating only a single one or a few forms on a movable element instead of a complete display. If this element is moved over a surface, the forms change their shape so that a similar impression as in a full display should be given. Due to the lack of sliding movement between finger and display, however, such representations are more difficult to read than classical Braille text lines.

For simplification and therefore to save costs it is already known in particular from SU 1633445 A1 not to control each point individually but to combine several points on one rotatable element. Here two horizontally adjacently arranged tactile elements are provided which consist of octagonal prisms. The display of an existing point pattern is made in this device by rotating the two elements—each representing a column of points of a character—wherein each of the respectively eight side surfaces display a different possible combination of points. Such octagonal prisms are however cumbersome and have therefore not been widely used in practice.

SUMMARY

The aim of the present invention is accordingly to provide a constructively simple and cost-effective device of the type cited initially.

According to the invention, this is achieved in that the four possible combinations of two tactile points of tactile points arranged adjacently in a line of points are in each case arranged on a common tactile element. Accordingly, in the solution according to the invention, a different number of tactile points are not represented on two adjacently arranged elements, i.e. divided into columns of points, as in the prior art, but on the contrary in each case one row of points of the tactile character is represented by one tactile element, i.e. one tactile element accordingly has—according to the setting—none, one left point, one right point or two tactile points. By means of the combination of at least two tactile elements, preferably at least three, in particular precisely three or four tactile elements, which each represent a line of points of a tactile character, all Braille forms can thus be represented in a constructively simple manner whilst maintaining the usual dimensions of Braille script.

With regard to a simple mounting and adjustment of the tactile elements or an entire group of tactile elements, it is favourable if the tactile elements are rotatably mounted wherein the tactile elements combined in a group in each case are mounted on a preferably common axis of rotation. Thus, preferably two, three or four tactile elements can be rotatably mounted on a single common axis so that the number of parts and therefore the construction expenditure is further reduced.

If the groups of tactile elements are mounted in a substantially annular receiving device, wherein the annular receiving device preferably comprises two annular carrier disks between which the tactile elements or groups of tactile elements are received, an advantageous arrangement of the tactile elements substantially along a circular orbit is achieved so that the tactile characters are represented preferably on an inner side of the hollow cylinder defined by the tactile elements. Here the reading takes place in the lower part of the tactile elements arranged substantially along a circular orbit which thus define a hollow cylinder in a usual hand and finger posture and relative movement between finger and display known from conventional Braille displays. Alternatively the tactile elements or the groups of tactile elements can also be mounted on a flat surface or along an arbitrarily curved surface deviating from a circular orbit.

In order to be able to adjust the distance between the tactile elements or groups of tactile elements mounted on the annular carrier disks with respect to one another, it is favourable if the annular receiving device comprises radial guide elements running in the radial direction for displaceable mounting of the groups of tactile elements. Thus, it is easily possible to reduce the spacing of the tactile elements with respect to one another by means of a radial inward displacement of the tactile elements or to increase the spacing between the tactile elements by means of a displacement outwards in the radial direction.

In order to further reduce the number of parts and therefore keep the manufacturing costs low, it is additionally advantageous if slot-shaped recesses each for receiving an axis of rotation of a group of tactile elements are provided as radial guide elements.

In order to be able on the one hand to twist the tactile elements without adjacent tactile elements blocking one another and on the other hand, in order to be able to produce the usual distance between two Braille characters or forms in one reading section, it is expedient to reduce the spacing between the tactile elements in the reading section with respect to an adjusting section. In this connection, it is favourable if a lower guide device is provided which displaces a plurality of groups of tactile elements radially inwards in a lower reading section.

With the aid of the lower guide device, the tactile elements are therefore displaced radially inwards in a lower reading section with the result that the spacing of the tactile elements with respect to one another is reduced and thus the desired spacing between two adjacent Braille forms is achieved in a simple manner. As soon as the tactile elements leave the reading section, this reduced section can be reversed again so that adjacent tactile elements can be twisted with respect to one another without any risk of blocking one another.

An inward displacement of the tactile elements in the reading section is achieved in a constructively simple manner if an exterior abutment surface is formed as lower guide device, by means of which the tactile elements are displaced inwards.

In order to achieve an outward displacement of the tactile elements outside the reading section, it is advantageous if an upper guide device is provided which displaces radially outwards at least one group, in particular several groups of tactile elements in an upper adjusting section.

If the upper guide device is configured as interior abutment surface(s) by means of which the tactile elements are displaced outwards, during the rotational movement of the carrier disks the tactile elements can run in a simple manner on the interior abutment surfaces of the upper guide device and are thus displaced radially outwards.

Alternatively to the aforesaid lower and upper guide devices, a radial displacement of the tactile elements can also be achieved in that the ends of the axes of rotation guided in the slot-shaped recesses are guided in a connecting link, i.e., curve-shaped groove, outside the carrier disks.

Since outside a lower reading section however, the adjustment or displacement of the tactile elements also takes place at the same time and in particular in the case of rectangular (cuboid shaped) tactile elements, the clear width of the tactile elements is increased to the length of the diagonals during the rotational movement, with regard to a reliable avoidance of a blockage in connection with the interior abutment surface, it is favourable if the interior abutment surfaces are at least partially formed by a plurality of preferably resiliently mounted guide elements. These resiliently mounted guide elements are advantageously provided in those sections in which at least one adjusting device is provided for turning a tactile element.

Alternatively to the aforesaid possibilities for release of the rotational movement of the tactile elements by radial displacement and locking of the rotational movement by abutment surfaces, respectively one web can be arranged between respectively two adjacent groups of tactile elements, i.e. in particular between respectively two forms of the Braille script.

These webs can be arranged between the two carrier disks in such a manner that in a blocking position in the lower reading section they fill the gap between respectively two adjacent groups of tactile elements to such an extent that any twisting of the tactile elements is prevented. Advantageously the webs are mounted in an upper adjusting section so that they can be displaced from a radially interior blocking position into a radially exterior release position so that in that region in which a rotational movement should be possible, they are extended accordingly to release the rotational movement.

Alternatively to the aforesaid possibility for locking and release of the rotational movement of the tactile elements by displaceable webs between the individual groups of tactile elements, these webs can also be connected non-displaceably to the carrier disks. In this case, it is advantageous if at least one group of tactile elements is mounted in an upper adjusting section so that they can be displaced from a radially interior blocking position into a radially exterior release position. Thus, according to the already described radial displacement in the lower reading section, the tactile elements can be moved between the webs and therefore locked whilst in that region in which a rotational movement should be possible, they are accordingly extended radially outwards to release the rotational movement.

In order to be able to adjust each tactile element during a revolution, in particular with the aid of the carrier disks, it is favourable if each row of tactile elements is assigned at least one actuator for twisting. The tactile elements of adjacent groups of tactile elements, which each form the same lines of points of a tactile character, form a common row of tactile elements. Accordingly, the device comprises at least two, preferably three or four rows of tactile elements. Thus, by means of the actuator assigned to the respective row of tactile elements after each revolution, a new adjustment can be made and thus an arbitrarily long text can be reproduced with an extremely small number of actuators and tactile elements.

With regard to a constructively simple solution for twisting the tactile elements, wherein during each twisting of the carrier disks a tactile element can be twisted not at all, by 90°, 180° or 270° and therefore any arbitrary combination of points can be set, it is advantageous if three groups of actuators which groups are arranged at a distance in the circumferential direction are provided, wherein each group of actuators each comprises an actuator assigned to each row of tactile elements. Thus, in each revolution any arbitrary combination of tactile points can be set in a simple manner in each group of tactile elements.

If at least one sensor is provided for determining position or angle and direction of rotation of the carrier disks, after a single revolution of the carrier disk it can be ascertained with the aid of the sensor and in a simple manner in which position the carrier disk is currently located and therefore a synchronization of the actuators with the angular position can be achieved.

In addition, with the aid of a readout unit for determining the rotational alignment of each tactile element, in particular within the framework of an initialization phase, i.e. in a simple first revolution of the carrier disks by 360°, the current initial position of each group of tactile elements can be detected. Thus, within the framework of an initialization phase with the aid of the sensor for determining position or angle and the readout unit, all the tactile elements or the rotational alignment thereof can be detected in a simple manner so that the desired text can then be adjusted with the aid of a corresponding control of the actuators.

In order to withdraw the tactile elements from undesired external influences and additionally achieve a reliable revolution of the carrier disks, it is advantageous if the receiving device together with tactile elements are accommodated in a housing, wherein guide rollers, preferably two lower and two upper guide rollers are provided between the housing and the carrier disks and/or a guide device.

If at least two rotatably mounted support rollers) are connected to the housing, the housing with the receiving device accommodated therein or with the tactile elements can be displaced in a simple manner on a substantially flat surface, e.g. a table or the like.

In order to simultaneously rotate the carrier disks of the tactile elements during the displacement of the housing, it is advantageous if an outer edge of the carrier disks or a preferably circumferential frictional element connected in a torque-proof manner to the carrier disks is arranged in such a manner that when the support rollers rest on a substantially flat ground surface the outer edge of the carrier disks and/or the circumferential frictional element is in frictional contact with the ground surface. Thus, during the displacement of the housing the carrier disks are rotated by running on a ground surface. Consequently it is advantageously not necessary to provide an external drive, e.g. an electric motor or the like for the revolution of the carrier disks. In principle however the provision of an external drive is naturally possible in an alternative embodiment.

Since in a usual Braille form only two points are provided per line of points and therefore all combinations (no point, point left, point right, both points) are adjustable with four sides, it is advantageous if the tactile elements are rectangular, wherein the side surfaces or tactile surfaces optionally having the tactile points each comprise equal-length longitudinal and transverse edges.

With regard to an easy tactility of the tactile points, it is advantageous if the side surfaces or tactile surfaces of the tactile elements each comprise a flat or concave base surface with respect to the tactile element from which tactile points optionally project in an elevated manner.

BRIEF DESCRIPTION OF THE FIGURES

The invention will be explained in detail hereinafter with reference to preferred exemplary embodiments shown in the drawings to which however it should not be restricted in any case. In the drawings in detail:

1A shows a perspective view of a group of tactile elements,

FIG. 12 shows a perspective view of a partially cutaway device which is placed on a ground surface.

DETAILED DESCRIPTION

Figure 1A:
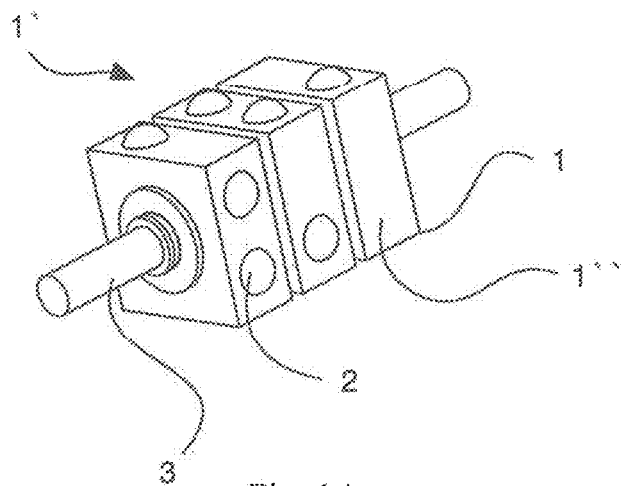
FIG. 1B shows a view of the end face of a group of tactile elements according to FIG. 1a, FIG. 1C shows a plan view of three groups of adjacent tactile elements.
Figure 1B:
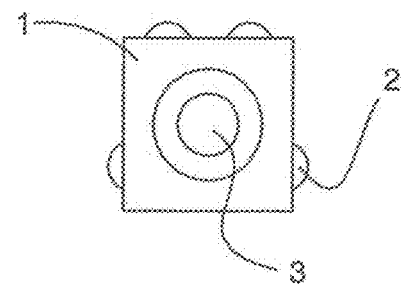

A group 1' of three substantially rectangular tactile elements 1 can be seen in FIGS. 1A and 1B. The three rectangular tactile elements 1 are rotatably mounted on a common axis of rotation 3 and thus combined to form a common group 1' of tactile elements 1.

The four side or tactile surfaces F' of each tactile element 1 here have none, one tactile point 2 arranged on the left or right or however two tactile points 2. Thus, with the three rectangular tactile elements 1, each arbitrary Braille form, consisting of a matrix of tactile points 2 which can be arranged in two adjacently arranged columns of points y and three lines of points x can be represented by appropriate twisting of the tactile element 1 on the axis of rotation 3.

Figure 1C:
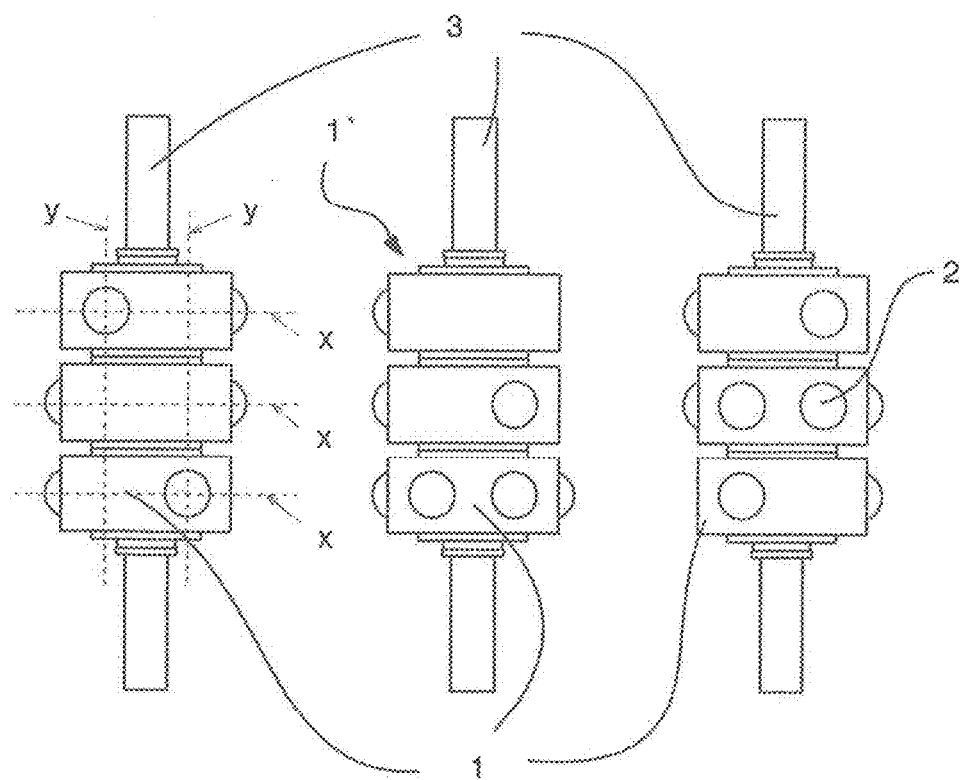

FIG. 1C shows three adjacently arranged such groups 1' of three tactile elements 1 arranged on a common axis of rotation 3 by means of which three adjacent Braille forms can thus be represented; thus, an arbitrarily long text can be represented by the arrangement of a plurality of such groups 1' of tactile elements 1.

Figure 2:
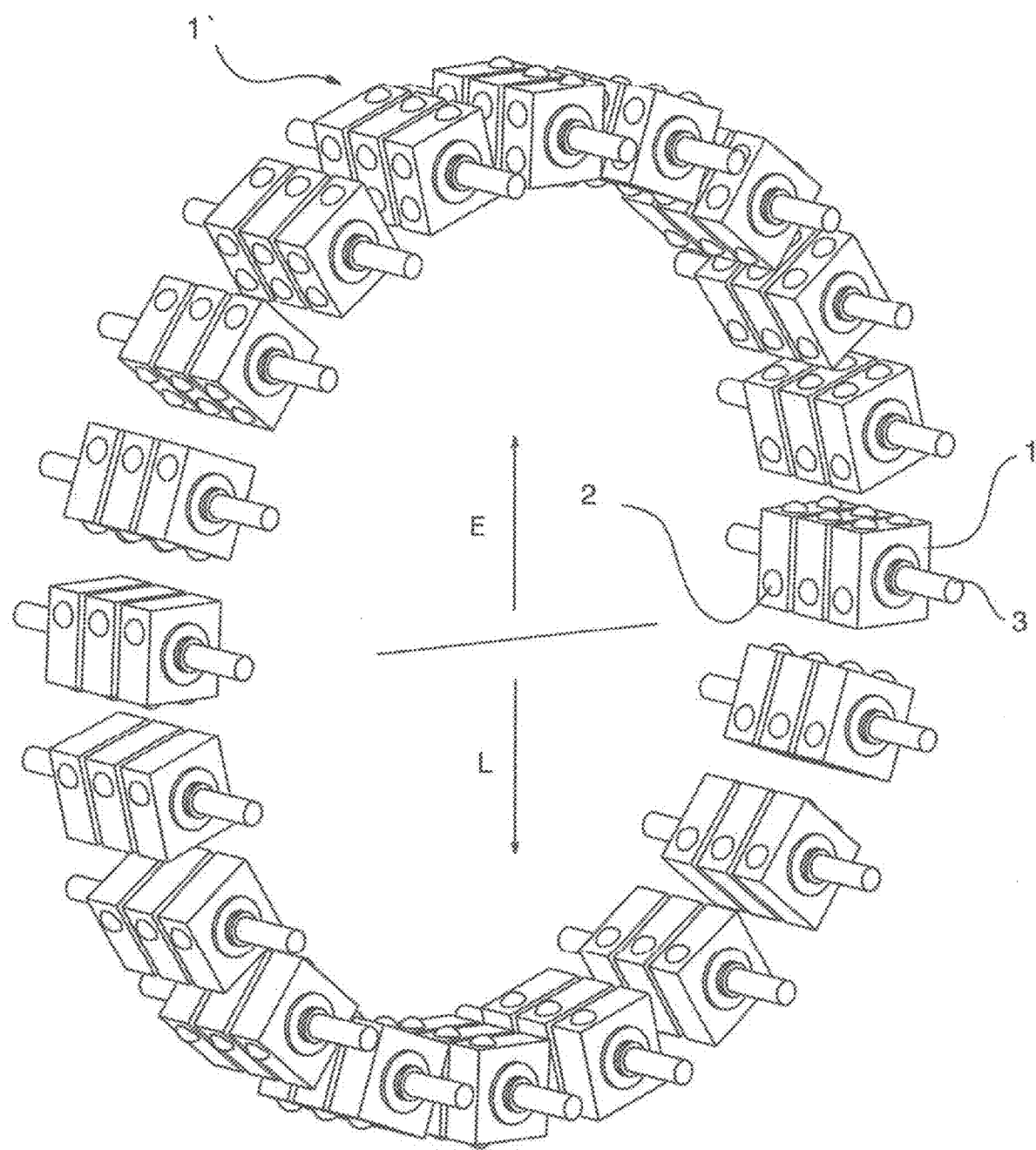
FIG. 2 shows a perspective view of a plurality of tactile elements each combined into groups of three mounted rotatably along a circular orbit.

In order to limit the number of required groups 1' of tactile elements 1, it is advantageous, as can be seen in FIG. 2, to arrange the groups 1' substantially along a circular orbit. As a result of such an arrangement, the groups 1' substantially define a hollow cylinder which in particular can be divided into a lower reading section L and an upper adjusting section E. In the lower reading section L a substantially concave surface is thus obtained on the inner side of the hollow cylinder which concave surface advantageously nestles against the fingertip of the person using the device so that a reading image substantially corresponding to a usual Braille display is given here.

Figure 3:
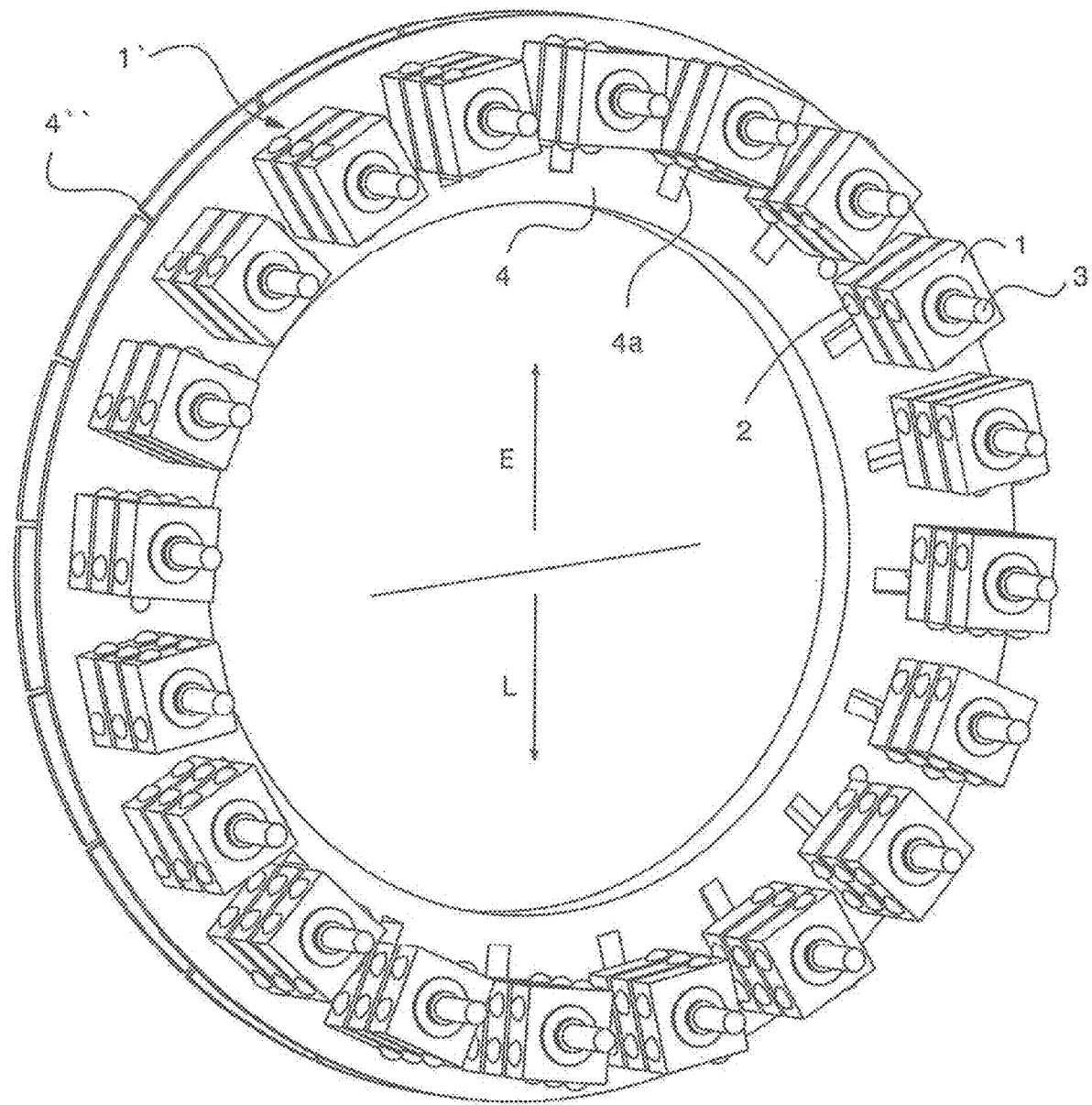
FIG. 3 shows a perspective view of the groups of tactile elements arranged along a circular orbit according to FIG. 2, which are mounted rotatably and displaceably in a carrier plate.

In FIG. 3 it is in particular apparent that the plurality of groups 1' of tactile elements 1 are mounted displaceably on a common annular carrier disk 4; the individual tactile elements 1 are here rotatably mounted about the respective axis of rotation 3. Naturally here this is only a cutaway view of the device. Also the freely projecting ends of the axes of rotation 3, which can be seen in FIG. 3 are each mounted in a corresponding (not shown) annular carrier disk 4; the carrier disks 4 together form the receiving device.

However, the groups 1' of tactile elements 1 are not only rotatably mounted but in addition, a radial guide device 4a in the form of guide slots can also be seen so that the groups 1' of tactile elements 1 in particular in the reading section L are brought close to one another by an inward displacement and in the adjusting section E are spaced apart from one another by an outward displacement. Thus, on the one hand a spacing such as is usually provided between two Braille forms can be set in the reading section L but on the other hand during the adjustment or twisting of the tactile elements 1, a collision with neighbouring tactile elements 1 in the adjusting section E can be reliably avoided.

Figure 4:
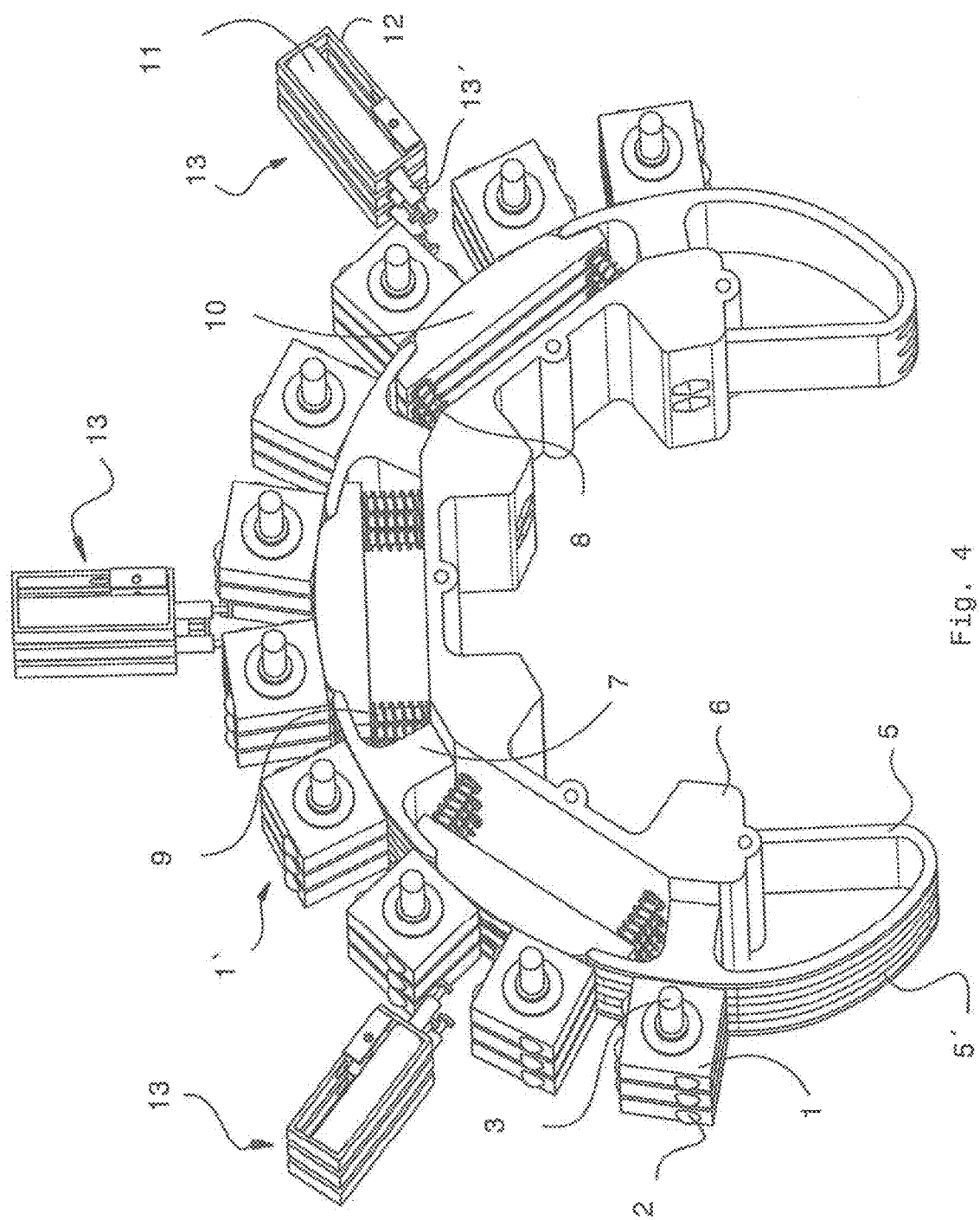
FIG. 4 shows a perspective view of an upper guide device as well as actuators.
Figure 5:
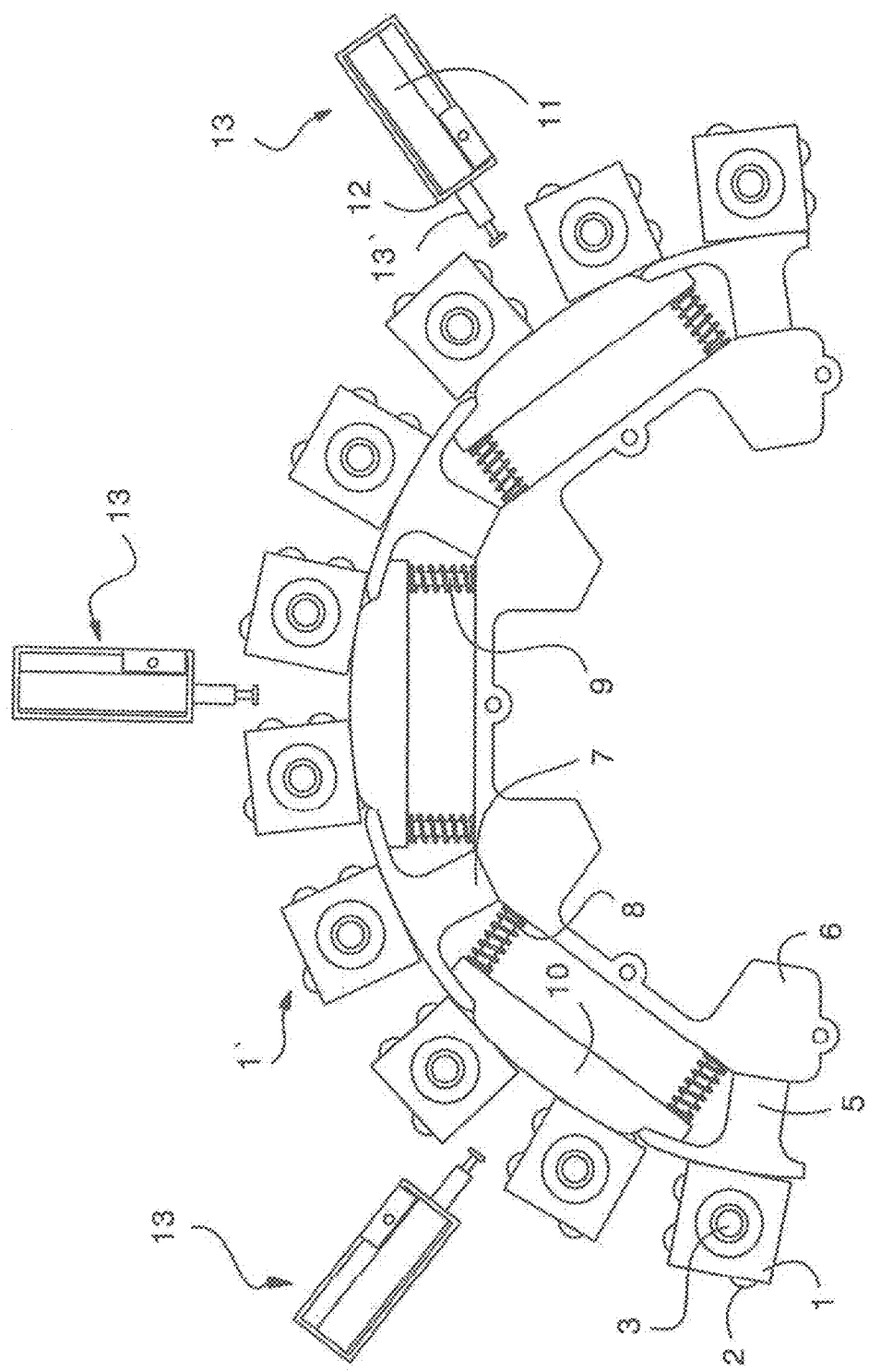
FIG. 5 shows a side view of the upper guide device and the actuators according to FIG. 4.

FIGS. 4 and 5 show an upper guide device 5 with a plurality of resiliently mounted guide elements 10.

The upper guide device 5 here fundamentally has a guide surface 5' running along a circular orbit which guide surface (interior abutment surface) 5' is interrupted in the region of three adjusting devices 13 arranged offset with respect to one another on the circumferential side. In these regions resiliently mounted guide elements 10 are provided in each case, which are mounted radially and linearly displaceably against the force of springs 8 with the aid of guide pins 9. The guide pins 9 as well as the guide track 5' as well as the non-resiliently mounted intermediate elements 7 are all arranged on a common holder 6.

Figure 6:
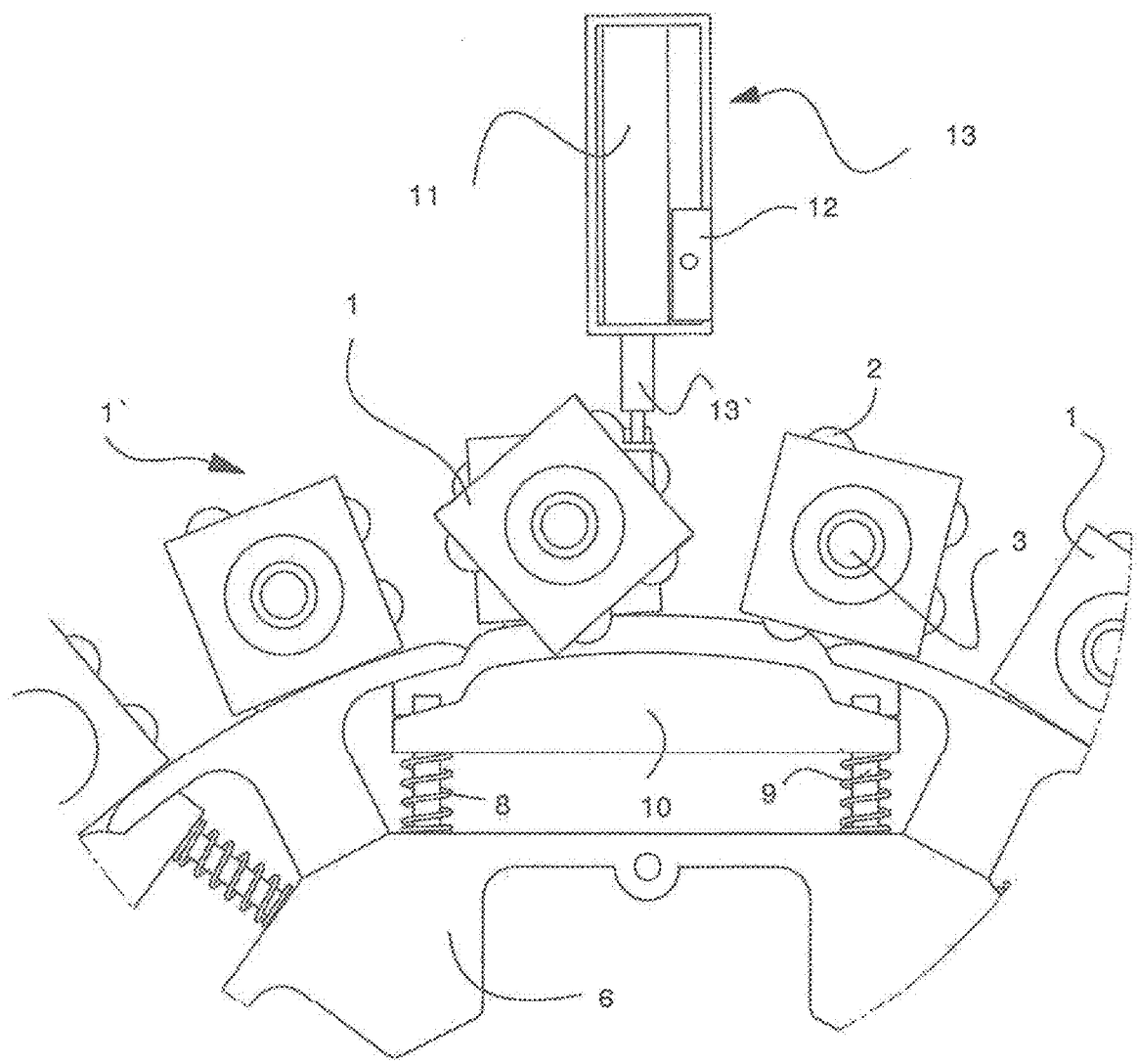
FIG. 6 shows a detailed view whilst an actuator comes into engagement with a tactile element.
Figure 7:
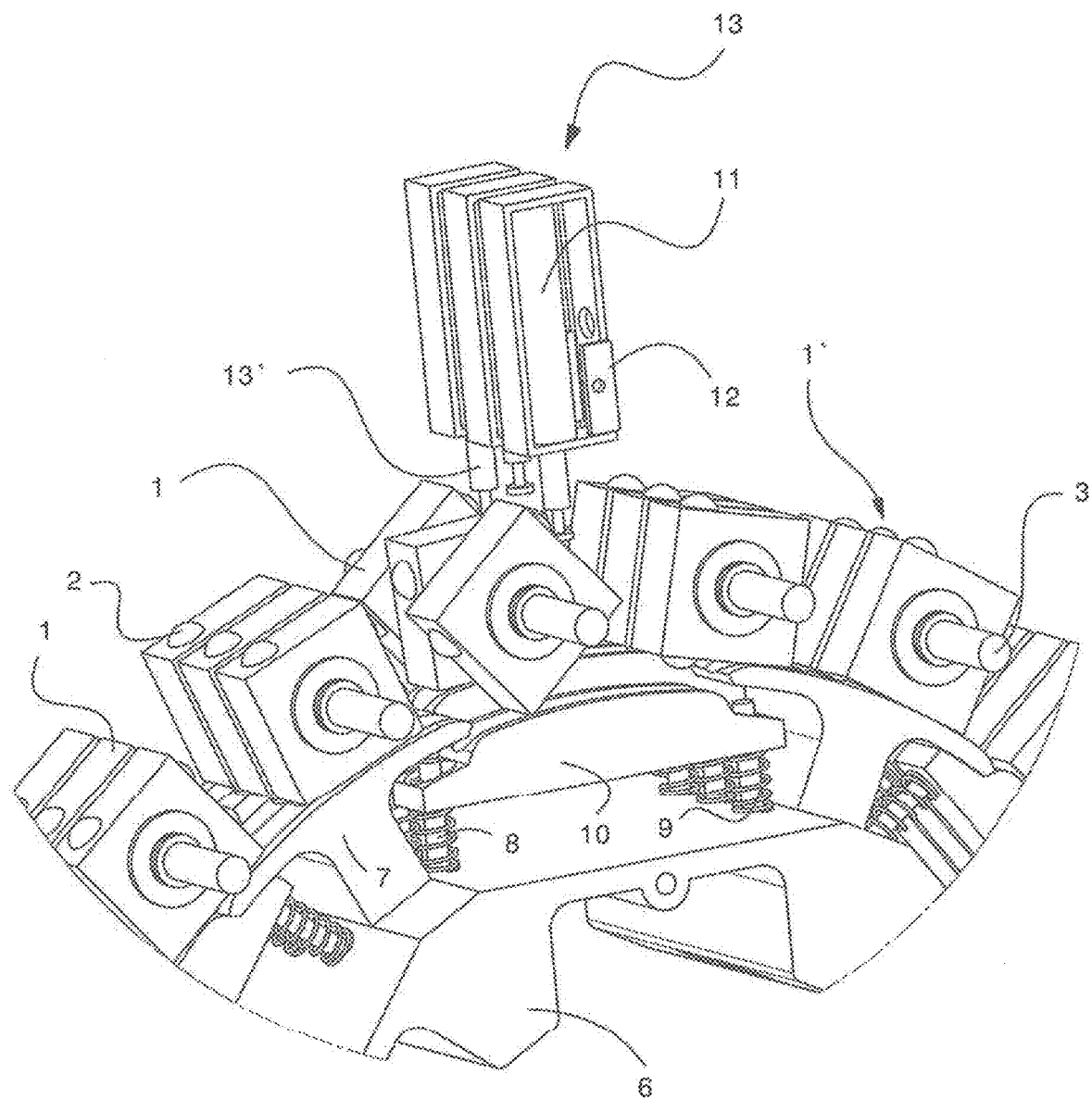
FIG. 7 shows a perspective detailed view during a twisting process of the tactile elements.

It can be seen in FIGS. 6 and 7 that for twisting a tactile element 1 as actuator, an actuator pin 13' of the adjusting device 13 extends with the aid of the actuator 11, e.g. a magnetic actuator which is accommodated in a housing 12, so that the actuator pin 13' comes into contact with the corresponding tactile element 1. As a result of the abutment of the actuator pin 13' on the rectangular tactile element 1, the tactile element 1 is twisted by 90° on the axis of rotation 1 during a run past an activated actuator 11. Each adjusting device 13 here has a number of adjacently arranged actuator pins 13' corresponding to the number of tactile elements 1.

During the twisting of a tactile element 1, the physical extension of the tactile element 1 in the direction of the interior upper guide device 5 increases since the extension of the rectangular tactile element 1 in the direction of the interior guide device 5 measured from the centre point of the axis of rotation 3 increases from half the side length to half the diagonal of the square base area of the rectangular tactile element 1. In order to enable an unhindered twisting, a resilient guide element 10 is provided in the region of the adjusting devices 13, which guide element 10 as can be seen in FIG. 6, deflects inwards during the twisting of the tactile element 1 and thus does not counteract any twisting of the tactile element 1.

Figure 8:
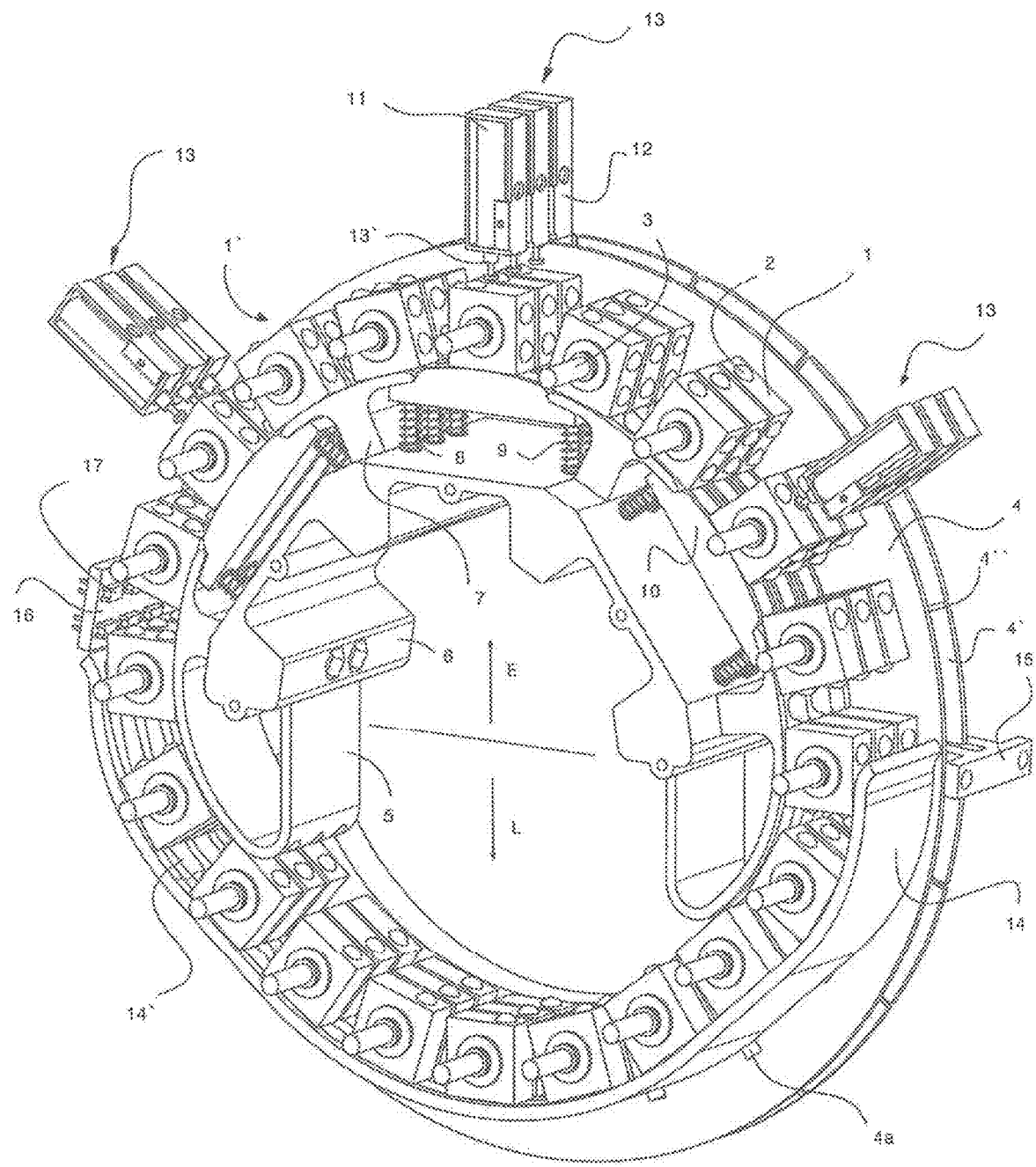
FIG. 8 shows a perspective view of a partially cutaway device with an upper and a lower guide device.
Figure 9:
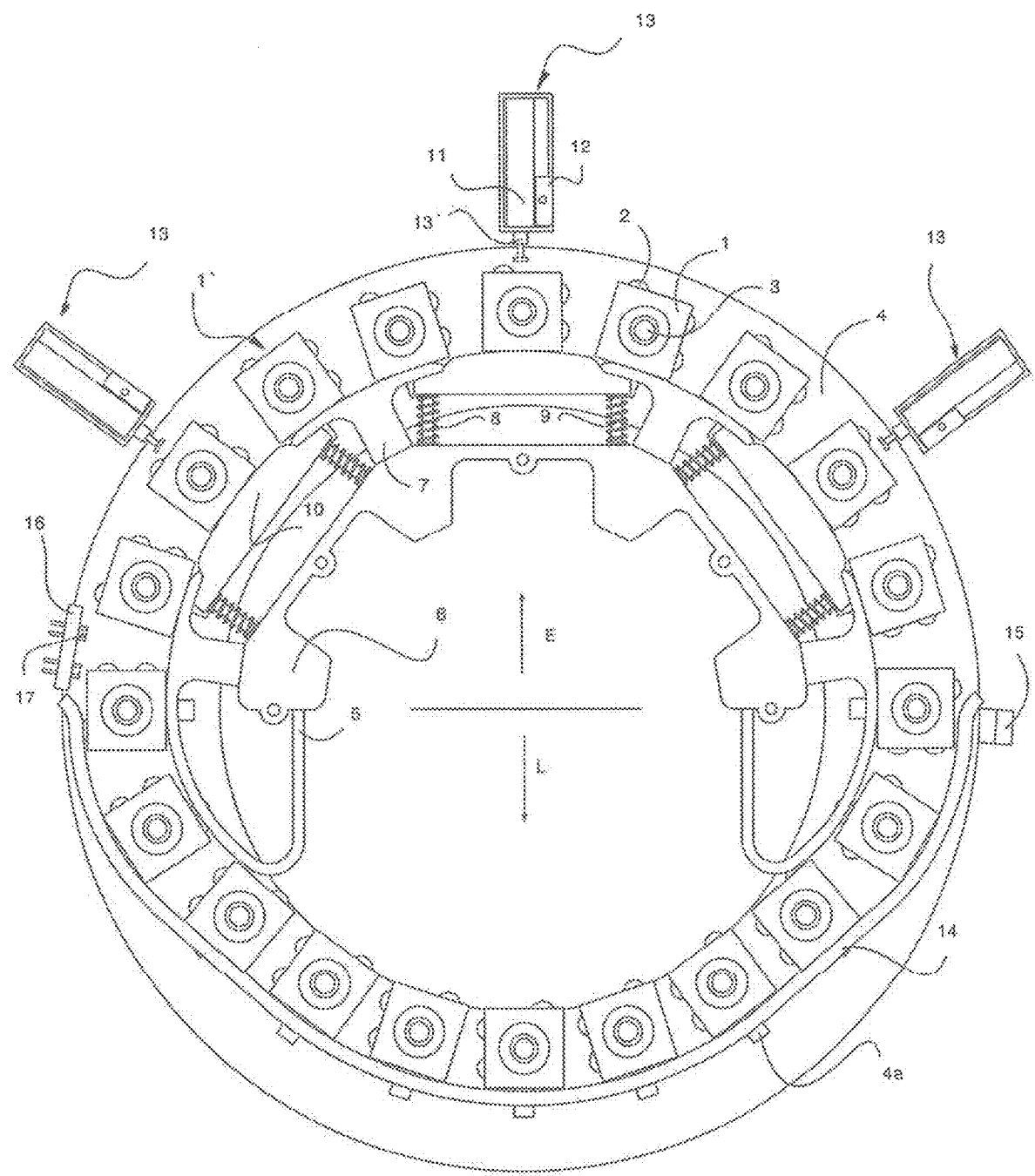
FIG. 9 shows a side view of the partially cutaway device according to FIG. 8.

FIGS. 8 and 9 each show a device according to the invention cutaway substantially along a plane of symmetry wherein here not only the upper guide device 5 but also a lower guide device 14 can be seen.

The lower guide device 14 substantially consists of an exterior guide surface (exterior abutment surface) 14' in relation to the tactile element 1 via which the tactile elements 1 are displaced radially inwards in particular in a lower reading section L in the guide slots 4a and thus are brought close to one another so that in the region of the lower reading section L the distance between two Braille forms defined by respectively one group 1' of tactile elements 1 corresponds to the usual distance between two Braille forms.

In this arrangement of adjacent groups 1' brought close to one another, these groups 1' or the tactile elements 1 cannot be twisted with respect to one another since they would block one another. Consequently it is provided that with the aid of the upper guide device 5 after exit from the lower reading section L and entry into the upper adjusting section E the group 1' of tactile elements 1 are again moved away from one another so that, as already described previously, with the aid of the adjusting devices 13 or the actuator pins 13 each tactile element 1 can be twisted by 90° in each case at three different positions. By this means during a single revolution each tactile element 1 can be twisted by 0, 90°, 180° or 270° so that none, one left, one right or both tactile point(s) can be aligned towards the inner side of the hollow cylinder; thus, any arbitrary Braille form can be represented with each group 1' of tactile elements 1 after a single revolution.

In order to determine the rotational alignment and the direction of rotation of the carrier disk 4 or a detection disk 4' connected in a torsion-proof manner thereto, a sensor 15, preferably in the form of a direction-dependent double fork light curtain is provided which detects slots 4" in the detector plate 4'. The slots run in plan view congruently with the guide slots 4a in which respectively one axis of rotation 3 is received. Thus, during the revolution of the carrier disk 4 it can be detected with the aid of the sensor 15 in each case in which rotational alignment the carrier disk 4 is located or which group 1' of tactile elements 1 is located in which position and in which direction the rotation takes place.

In order to detect the position or rotational alignment of the individual tactile elements 1, a readout unit 17 preferably in the form of reflection light curtains is further provided, which is arranged on a carrier plate 16. Herewith in particular first and foremost in the course of an initialization phase which provides a single rotation by 360°, the arrangement of all the tactile elements 1 of all the groups 1' is recorded and stored.

With the aid of a computer-implemented method—which does not form the subject matter of this invention—any arbitrary text can be represented with the aid of the device according to the invention using the sensor 15 and the readout unit 17 and a corresponding activation of the control device 13.

Figure 10:
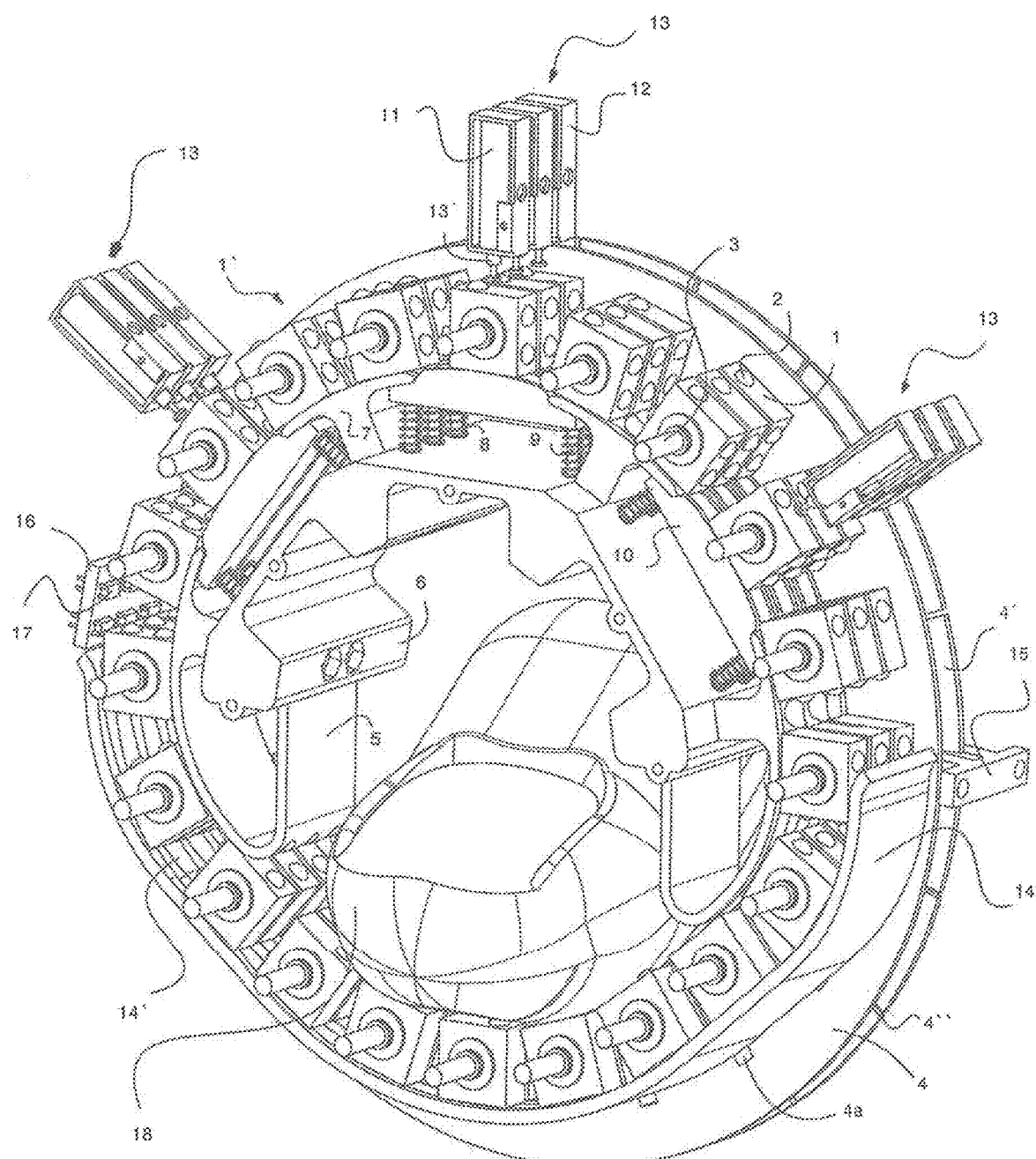
FIG. 10 shows a perspective view according to FIG. 8 with a schematically depicted finger of a person.
Figure 11:
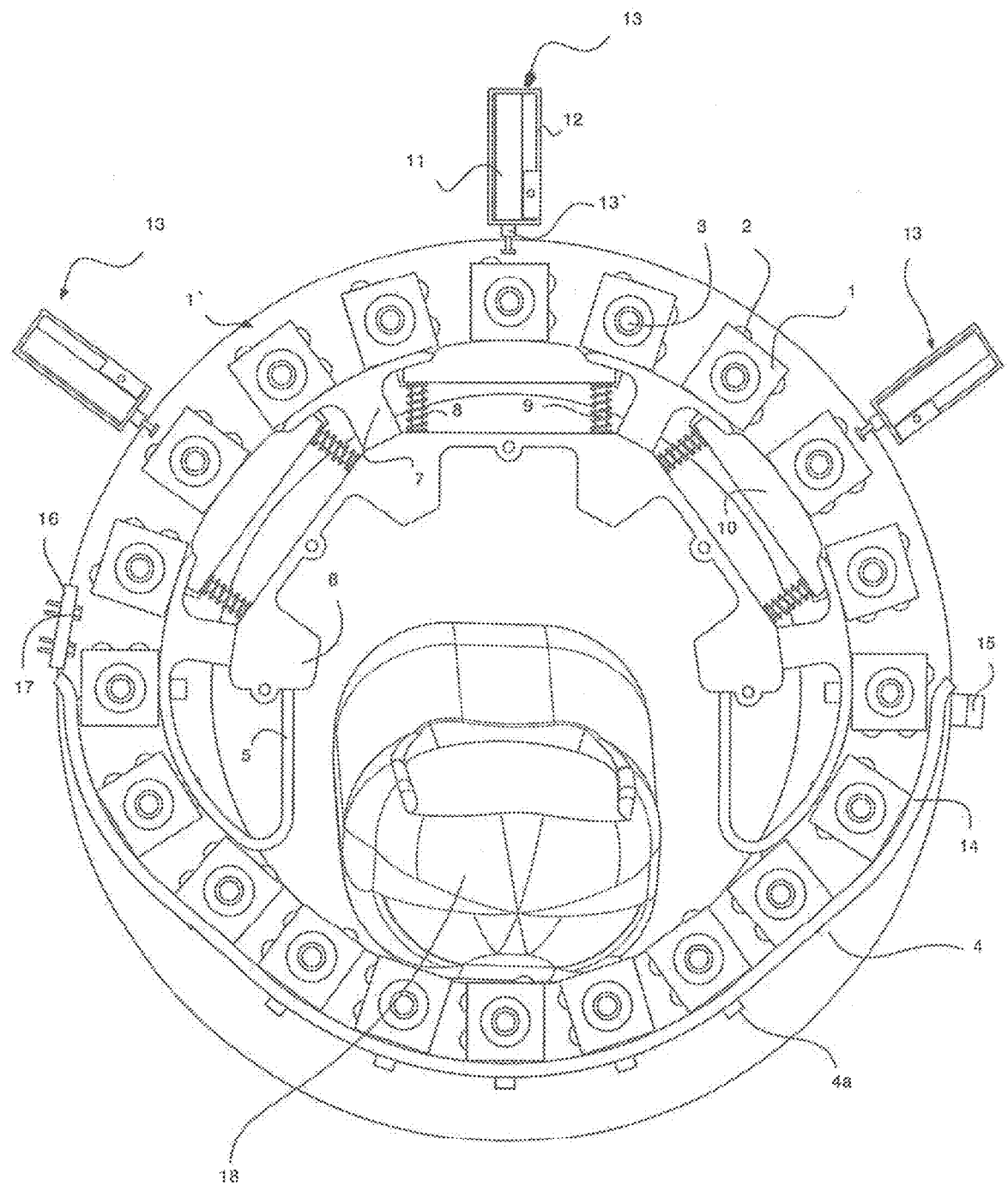
FIG. 11 shows a side view corresponding to FIG. 10 with the schematic view of a finger of a person.

It can then be seen in FIGS. 10 and 11 that a person using the device can place a finger 18 or a fingertip into the lower reading section L of the hollow cylinder in order to then be able to touch the Braille forms located in the reading section L or sliding past the finger.

FIG. 12 shows the device partially cutaway along a symmetry with a housing 23 which has two support rollers 21 by means of which the entire device can easily be displaced on a substantially flat ground surface 24, e.g. a table or the like.

During such a displacement movement, an outer edge 25 of the carrier disks 4 or a frictional element preferably connected circumferentially therewith (not shown) also touches the ground surface 24 so that during a displacement or linear movement of the housing 23 on the ground surface 24 the carrier disks 4 together with tactile elements 1 mounted therein are rotated together with the rotational movement of the carrier disks 4 so that different groups 1' of tactile elements 1 subsequently enter into the reading section L. The tactile elements 1 are then turned into the adjusting section E in which they are adjusted with the aid of the adjusting device 13 and then go back into the reading section L again. With the aid of the device according to the invention, an arbitrarily long text in the form of tactile elements can thus be represented.

It can additionally be seen in FIG. 12 that two upper guide rollers 19 are rotatably connected to the housing 23 in the upper adjusting section E and in addition, two lower guide rollers 20 are rotatably connected to the lower guide device or the housing 23. With the aid of the guide rollers 19, 20, the tactile elements 1 mounted displaceably in the carrier disk 4 and running substantially along a circular orbit are reliably centred in the housing 23.

Figure 13A:
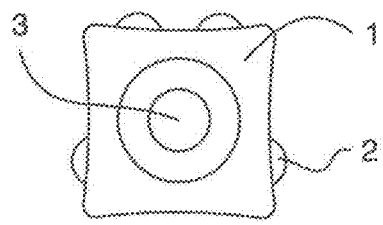
FIG. 13A shows a view of a front side of an alternative exemplary embodiment of a tactile element.
Figure 13B:
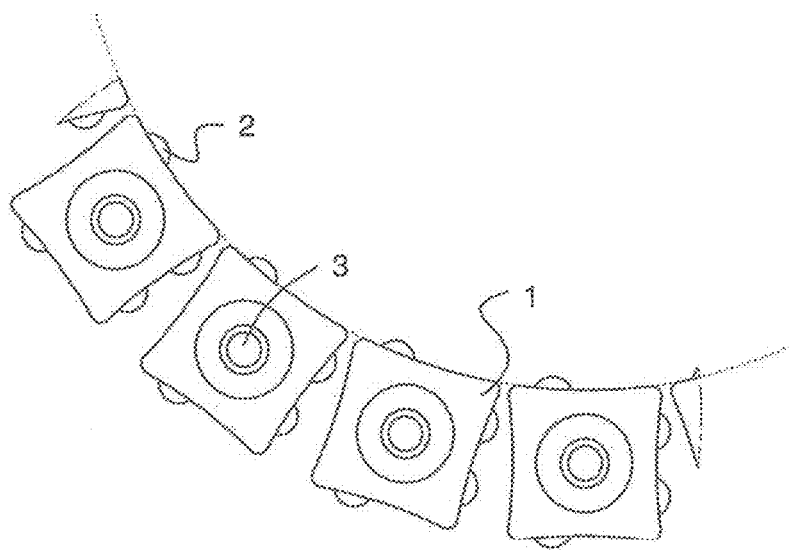
FIG. 13B shows a side view of several groups of adjacent tactile elements according to FIG. 13A.
Figure 13C:
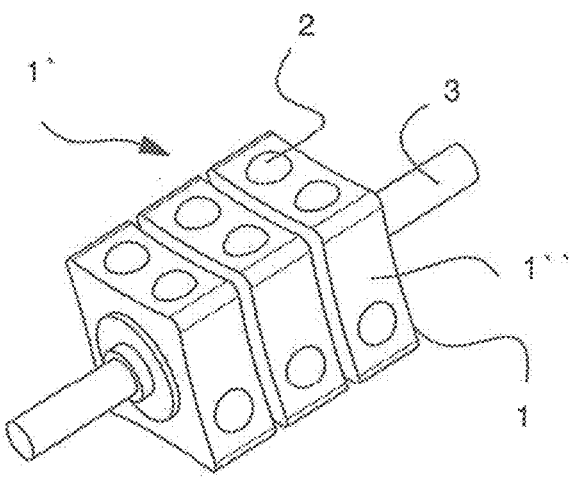
FIG. 13C shows a perspective view of a group of tactile elements according to the alternative exemplary embodiment according to FIG. 13A.

FIGS. 13A to 13C show an alternative exemplary embodiment wherein here the rectangular tactile elements have slightly concavely curved side or tactile surfaces 1". In the previously described exemplary embodiment on the other hand, substantially planar side surfaces 1" are provided.

The curvature of the side surfaces 1" preferably corresponds, as can be seen in particular in FIG. 13B, to a virtual circular orbit which is defined by the adjacently arranged grouped tactile elements 1. Thus, a surface running substantially continuously along a single circular orbit is obtained for the person using the device, from which surface the elevated tactile points 2 project.

However it is merely essential that the four different point combinations of a line of points are combined in a single tactile element so that with the aid of at least three such tactile elements preferably mounted on a common axis of rotation, all the usual Braille forms can be represented.

Figure 14B:
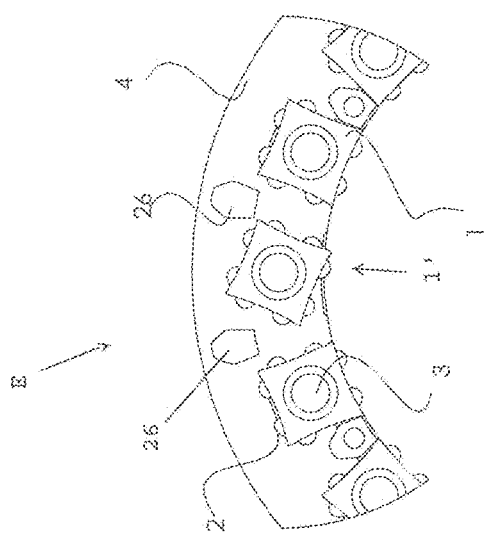
FIG. 14B shows a view of an embodiment according to FIG. 14A, wherein the webs are arranged in a displaced release position
Figure 14A:
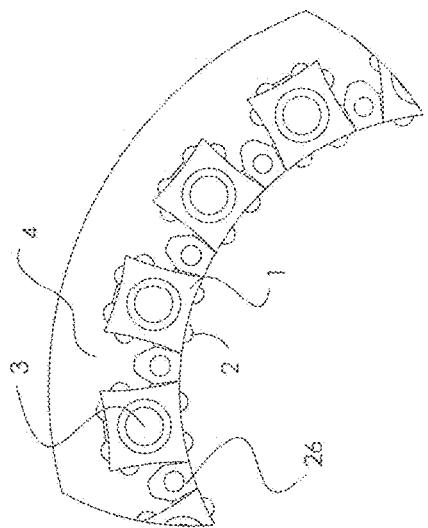
FIG. 14A shows a view of an alternative exemplary embodiment for locking and release of the rotational movement of the tactile elements with webs arranged between the carrier disks.
Figure 14C:
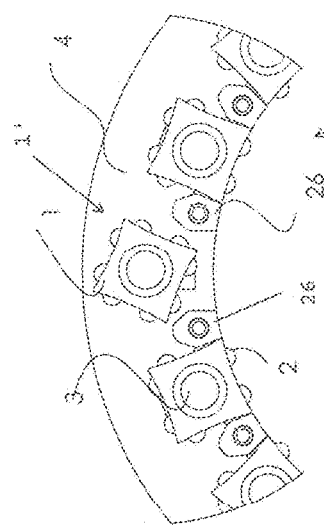
FIG. 14C shows a view of an alternative embodiment according to FIG. 14A, wherein a group of tactile elements is arranged in a displaced release position.

FIGS. 14A to 14C show an alternative exemplary embodiment for the locking and release of the tactile elements 1 for the rotational movement thereof, wherein here webs 26 are arranged between the carrier disks 4. FIG. 14B shows an upper adjusting section E in which two webs 26 which are arranged adjacent to a group 1' of tactile elements 1 are shown in a release position displaced radially outwards from a radially interior locking position (cf. FIG. 14A). In this exterior release position the tactile elements 1 are released for a rotational movement and can thus be twisted in a simple manner with an adjusting device 13 (not shown in FIG. 14B).

FIG. 14C shows an alternative embodiment for the locking and release of the rotational movement of the tactile elements 1, wherein in an upper adjusting section E a group 1' of tactile elements 1 is displaced from a radially interior blocking position (cf. FIG. 14A) into a radially exterior release position. In this exterior release position of the tactile elements 1, these are released for a rotational movement and can thus be twisted in a simple manner using an adjusting device 13 (not shown in FIG. 14C).

The invention claimed is:

1. A device for representation of tactile characters comprising tactile elements which are combined in groups, wherein a tactile character consists in each case of a matrix of tactile points which are arrangeable in two adjacently arranged columns of points and at least two lines of points, wherein four possible combinations of two tactile points of tactile points arranged adjacently in a line of points are arranged on each one of the tactile element, wherein the tactile elements are rotatably mounted and the tactile elements combined in a group in each case are mounted on a common axis of rotation, wherein tactile elements combined in different groups comprise different substantially parallel axes of rotation.

2. The device according to claim 1, wherein the groups of tactile elements are mounted in a substantially annular receiving device, wherein the annular receiving device comprises two annular carrier disks between which the tactile elements are received; and wherein the tactile characters are Braille.

3. The device according to claim 2, wherein the annular receiving device comprises radial guide elements running in a radial direction for displaceable mounting of the tactile elements.

4. The device according to claim 3, wherein slot-shaped recesses each for receiving an axis of rotation of a group of tactile elements are provided as radial guide elements.

5. The device according to claim 1, wherein a lower guide device is provided which displaces a plurality of groups of tactile elements radially inwards in a lower reading section.

6. The device according to claim 5, wherein an exterior abutment surface is formed as the lower guide device, by means of which the tactile elements are displaced inwards.

7. The device according to claim 1, wherein an upper guide device is provided which displaces radially outwards at least one group of tactile elements in an upper adjusting section, wherein the upper guide device is configured as an interior abutment surface by means of which tactile elements are displaced outwards, wherein the upper guide device displaces several groups of tactile elements outwards, and wherein the interior abutment surface is partially formed by a plurality of resiliently mounted guide elements.

8. The device according to claim 1, wherein respectively one web is arranged between two adjacent groups of tactile elements.

9. The device according to claim 8, wherein the webs are mounted in an upper adjusting section so that they are displaceable from a radially interior blocking position into a radially exterior release position.

10. The device according to claim 8, wherein at least one group of tactile elements is mounted in an upper adjusting section so that it is displaceable from a radially interior blocking position into a radially exterior release position.

11. The device according to claim 1, wherein each row of tactile elements is assigned at least one actuator for twisting.

12. The device according to claim 11, wherein three groups of actuators arranged at a distance in a circumferential direction are provided, wherein each group of actuators each comprises an actuator assigned to each row of tactile elements.

13. The device according to claim 2, wherein at least one sensor is provided for determining position or angle and direction of rotation of the carrier disks.

14. The device according to claim 1, wherein a readout unit is provided for determining a rotational alignment of each tactile element.

15. The device according to claim 2, wherein the annular receiving device together with tactile elements are accommodated in a housing, wherein guide rollers are provided between the housing and the carrier disks and/or a guide device.

16. The device according to claim 15, wherein at least two rotatably mounted support rollers are connected to the housing; and wherein two lower and two upper guide rollers are provided between the housing and the carrier disks or a guide device.

17. The device according to claim 16, wherein an outer edge of the carrier disks or a circumferential frictional element connected in a torque-proof manner to the carrier disks is arranged in such a manner that when the support rollers rest on a substantially flat ground surface the outer edge of the carrier disks or the circumferential frictional element is in frictional contact with the ground surface.

18. The device according to claim 1, wherein the tactile elements are rectangular, wherein side surfaces having the four tactile elements each comprise equal-length longitudinal edges and transverse edges; and wherein the side surfaces having the tactile elements comprise flat or concave base surfaces with respect to the tactile element from which base surfaces tactile points project in an elevated manner.

19. The device according to claim 1, wherein the four possible combinations of two tactile points of tactile points arranged adjacently in the line of points are made up by the set of:
   no tactile point, one tactile point arranged on the left and no tactile point arranged on the right, one tactile point arranged on the right and no tactile point arranged on the left, and two tactile points.

20. The device according to claim 1, wherein each tactile element comprises four side surfaces, wherein the side surfaces have respectively: no tactile point, one tactile point arranged on the left and no tactile point arranged on the right, one tactile point arranged on the right and no tactile point arranged on the left, and two tactile points.

* * * * *